United States Patent [19]
Walker et al.

[11] Patent Number: 5,151,962
[45] Date of Patent: Sep. 29, 1992

[54] FIBER OPTIC CABLE ASSEMBLIES FOR LASER DELIVERY SYSTEMS

[75] Inventors: James P. Walker, Arlington; Jack Aucoin, S. Attleboro, both of Mass.; Randall Drew, Cumberland, R.I.

[73] Assignee: Fiber Delivery Concepts, Inc., Hudson, Mass.

[21] Appl. No.: 703,020

[22] Filed: May 20, 1991

[51] Int. Cl.[5] ............................................. G02B 6/44
[52] U.S. Cl. ...................................... 385/86; 385/78; 385/136; 385/902
[58] Field of Search ............... 350/96.10, 96.15, 96.18, 350/96.20, 96.21, 96.22, 96.23, 96.24, 96.25, 96.26, 96.29; 250/227.24; 385/53, 76–78, 81, 86, 87, 88, 92, 134, 136, 137, 139, 902, 31, 33–35

[56] References Cited

U.S. PATENT DOCUMENTS

| | | | |
|---|---|---|---|
| 3,897,134 | 7/1975 | Scrivo et al. | 350/96.22 |
| 4,732,450 | 3/1988 | Lee | 385/33 |
| 4,772,093 | 9/1988 | Abele et al. | 350/96.25 |
| 4,867,525 | 9/1989 | DiMarco et al. | 350/96.20 |
| 4,944,567 | 7/1990 | Kuper et al. | 350/96.18 |
| 4,988,163 | 1/1991 | Cohen et al. | 385/31 |

*Primary Examiner*—John D. Lee
*Attorney, Agent, or Firm*—Wolf, Greenfield, Sacks

[57] ABSTRACT

A fiber optic cable assembly in one embodiment includes an optical fiber, a jacket member axially surrounding the fiber, a connector for coupling the fiber to a source of laser radiation, a strain relief boot attached to the connector and axially surrounding a substantial length of the jacket and the optical fiber, and a support element axially surrounding the proximal end of the optical fiber and separating the jacket and connector from the fiber. In a second embodiment, the cable has first and second jacket portions and a third jacket portion rotatably coupled therebetween. The third jacket portion includes three tubular passages, two of which are arranged in axial alignment with the optical fiber and a third passage angularly connected to the first two and rotatable in an arc about the fiber axis. The third passage is operatively coupled to a fluid port which may be disposed at various arcuate positions about the fiber axis for fluid flow into the third passage. In a third embodiment, a laser delivery system includes an elongate fiber, a jacket member surrounding the fiber, and a plastic housing with a metal stem integrally molded therein. A central bore extends through the housing and into the metal stem to form a continuous bore into which the fiber is received.

17 Claims, 4 Drawing Sheets

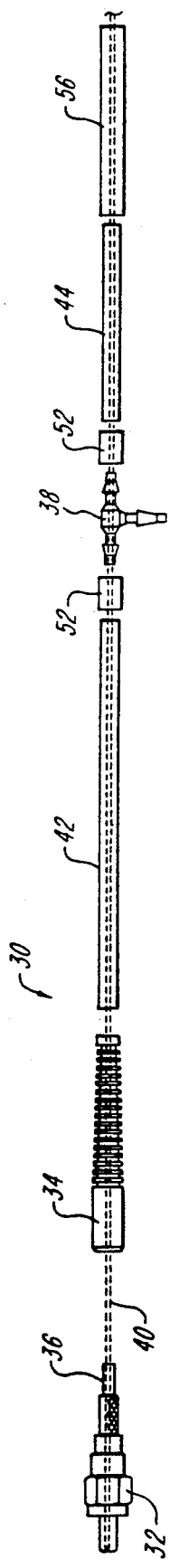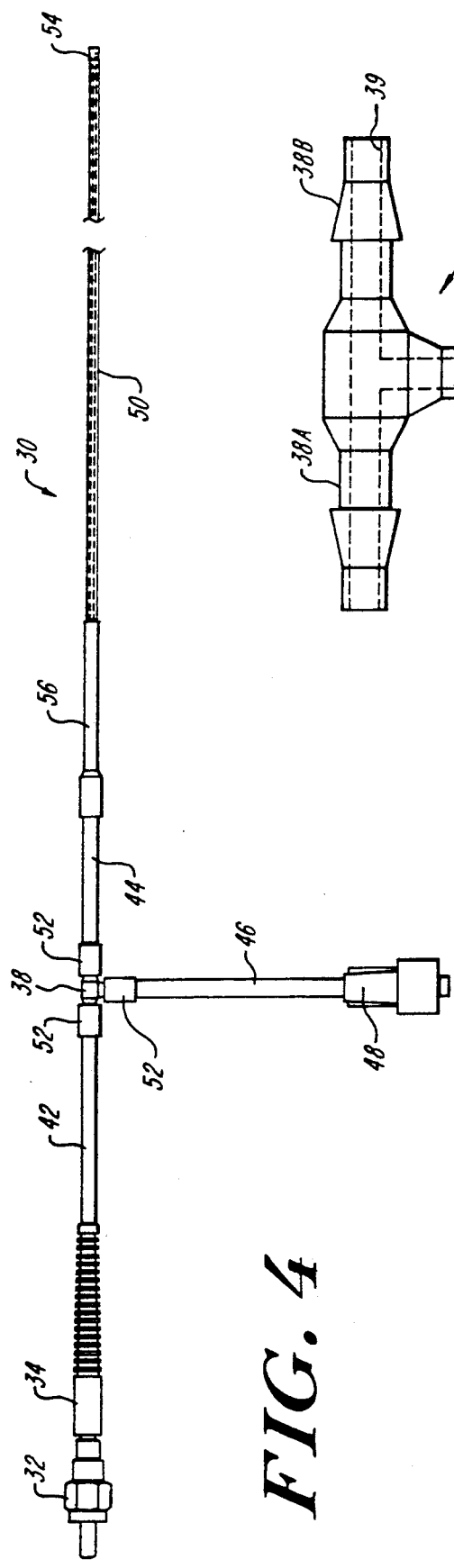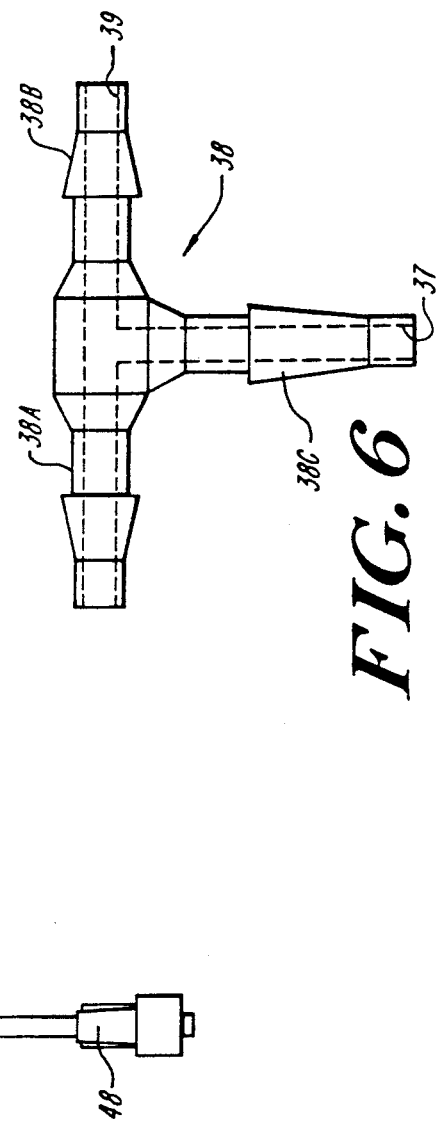
FIG. 4
FIG. 5
FIG. 6

FIBER OPTIC CABLE ASSEMBLIES FOR LASER DELIVERY SYSTEMS

FIELD OF THE INVENTION

This invention relates generally to laser delivery systems, and, more particularly, to fiber optic cable assemblies for use in surgical and medical applications.

BACKGROUND OF THE INVENTION

The use of laser energy to perform surgical procedures on living tissue is becoming more common. Typically, the laser energy is transmitted through an optical fiber to the surgical site. The optical fiber is usually included in a catheter or similar assembly which is inserted into the body through a small incision or a body orifice. In some applications, optical fiber assemblies are used in conjunction with endoscopes to perform surgical procedures on the gallbladder and urinary tract. In other applications, a hand-held laser system may be used to cut or cauterize living tissue.

A typical laser catheter includes a glass or silica fiber and a tubular shaft which axially surrounds the fiber. One end of the fiber and shaft are connected to a coupling device which optically couples the fiber to a source of laser radiation. Bending or torquing the optical fiber along a small bend radius adversely affects the transmission properties of the fiber and ultimately the efficiency of the whole laser system. Some laser catheters include strain relief devices disposed about the proximal end of the catheter shaft to limit the radius to which the proximal end of the fiber is bent relative to the axis of the laser source. Most strain relief devices, however, do not provide any means for maintaining the optical fiber in axial alignment with the laser source at the point where the fiber emerges from the coupling mechanism. Accordingly, it is an object of the present invention to improve the transmission property of an optional fiber assembly by providing an improved strain relief device which maintains the axial alignment of the proximal end of the fiber with laser source.

A problem associated with the transmission of laser energy through an optical fiber relates to cooling of the fiber. The propagation of laser energy through the fiber results in rapid heating of the fiber core and cladding. In some laser catheters, fluid is introduced into the space intermediate the optical fiber and the wall of the catheter shaft to help dissipate heat from the fiber. Such catheters require special coupling connectors, to introduce the fluid into the interior of the catheter shaft. Most such coupling connectors are fixed to the catheter shaft and require bending of the shaft, and optical fiber, to properly couple the connector to a source of cooling medium. As explained above, bending or torquing of the fiber axis adversely affects its transmissive properties.

Accordingly, it is an object of the present invention to provide a connector for supplying a cooling medium to a catheter shaft which may be rotatably mounted within the shaft to facilitate operative coupling to a source of cooling medium which may be located at any arcuate position relative to the axis of the catheter and optical fiber.

In hand-held or "hot knife" laser delivery systems, the distal end of the optical fiber extends through a handle mechanism and a stainless steel stem. During the assembly of such systems the optical fiber is threaded through the handle mechanism into the stainless steel stem and distally therebeyond. In prior art handle mechanisms, upon insertion of the stainless steel stem into the handle portion, a shoulder or abrupt decrease in the diameter of the handle bore is often formed at the junction of the stem and the handle. When the optical fiber is subsequently threaded through the handle and into the stem, the distal tip of the fiber often grazes or collides with the shoulder formed at the junction of the handle and stem. Such contact often chips or damages the extreme distal tip of the optical fiber which has a precision sculpted shape, as required by the specific surgical procedure. Any damage to the distal tip of the fiber also adversely affects the transmissive properties of the fiber and, ultimately, the utility of the whole laser system. Also, the manner in which the stem is inserted into the handle directly effects the integrity of the handle/stem joint and the tendency for the stem to rotate relative to the axis of the handle.

Accordingly, it is an object of the present invention is to provide a handle apparatus for a hand-held laser system in which the optical fiber may be threaded through the handle without the risk of damaging the distal tip of the optical fiber.

A further object of the present invention to provide a handle apparatus for use with a hand held laser delivery system in which the internal bore of the handle and stem, particularly at the handle/stem juncture, tapers smoothly to eliminate any obstructions or projections which may damage the tip of the optical fiber upon insertion.

Another object of the present invention is to provide handle apparatus for a hand held laser system in which a strong joint is formed between the stem and the handle, and which further reduces the tendency for the stem to rotate within the handle.

Yet another object of the present invention is to provide a handle apparatus for a hand-held laser system in which the handle is molded about the stem portion of the handle mechanism.

Another object of the present invention is to provide a laser delivery system with improved transmissive properties by maintaining the axial alignment of the optical fiber with a source of laser radiation at its point of coupling and for an increased distance therebeyond.

A further object of the present invention is to provide a laser delivery system having an improved strain relief mechanism which limits the bend radius over a substantial portion of the fiber proximal end.

Yet another object of the present invention is to provide a laser delivery system having a strain relief mechanism which supports the proximal end of the fiber and maintains axial alignment between the fiber and the laser source at its proximal end.

Still a further object of the present invention is to provide a laser delivery system in which the optical fiber is fluid cooled.

Yet another object of the present invention is to provide a laser delivery system in which a cooling medium is introduced into the laser catheter shaft by a connector which is rotatably mounted to the catheter.

A further object of the present invention is to provide a connector for introducing a cooling medium into a catheter shaft which is rotatably mounted to the catheter shaft allowing the source of cooling medium to be disposed at any arcuate position about the axis of the optical fiber.

SUMMARY OF THE INVENTION

The above and other objects are achieved in accordance with the present invention which according to one embodiment provides a fiber optic cable assembly for use in a laser delivery system. The cable assembly comprises an elongate optical fiber, a jacket member axially surrounding the optical fiber, means for optically coupling the fiber to a source of laser radiation, a strain relief means attached to the coupling means and axially surrounding a substantial length of the jacket member and fiber, and a support element axially surrounding a portion of the optical fiber and separating said optical fiber from the jacket member and the coupling means for maintaining the fiber in axial alignment with the source of laser radiation.

In a second embodiment of the present invention, a fiber optic cable for use in a laser delivery system comprises an elongate optical fiber, first and second jacket portions disposed about first and second axial lengths, respectively, of the fiber, and a third jacket portion rotatably coupled to the first and second jacket portions. The third jacket portion comprises three tubular passages, two of the passages arranged in axial alignment to surround the optical fiber about its axis, and a third passage angularly connected to the two passages and rotatable in an arc about the fiber axis. The third passage is operatively coupled to a fluid port, the port capable of being disposed at various arcuate positions about the fiber axis for fluid flow into the third passage.

In a third embodiment of the present invention, a laser delivery system comprises a source of laser radiation, an elongate optical fiber optically coupled to the source, a jacket member partially surrounding the axial length of the fiber, and an elongate housing member having a central bore extending therethrough for receiving the fiber. The housing member is substantially rigid and sized to be hand-held. The system further comprises an elongate metal tube having a curved distal end and a flaired proximal end integrally coupled to the housing member by a molded-in place joint and axially aligned with the central bore of the housing member so as to form a continuous bore into which the fiber is received, with the fiber extending distally beyond the distal tip of the metal tube. The foregoing and other features, objects and advantages of the invention will be more fully understood by reading the detailed description below in conjunction with the drawings.

BRIEF DESCRIPTION OF THE DRAWINGS

In the drawings:

FIG. 4 is a side view of a second embodiment of a fiber optic cable assembly in accordance with a second embodiment of the present invention;

FIG. 5 is a partial exploded view of the cable assembly of FIG. 4;

FIG. 6 is a side view of the rotatable connector assembly of FIG. 5;

DETAILED DESCRIPTION

Figure 1:
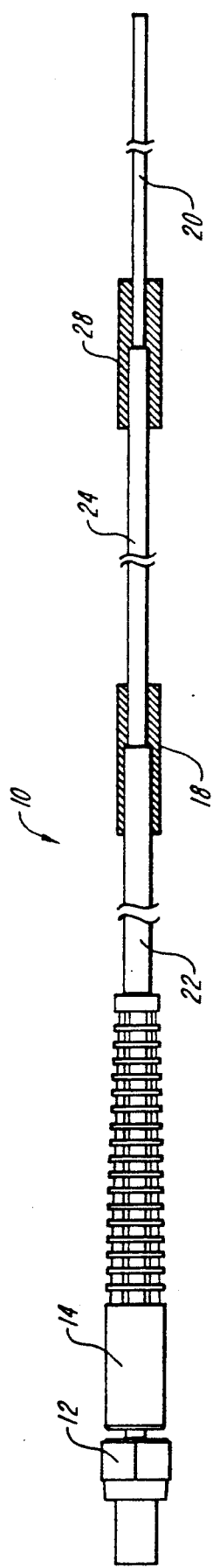
FIG. 1 is a side view of a first embodiment of the fiber optic cable assembly of the present invention with the junction tubes shown cut-away.

With reference now to the drawings, and more particularly to FIG. 1 thereof, a laser delivery system 10, in accordance with a first embodiment of the present invention, is shown. Catheter 10 comprises a connector 12, strain relief boot 14, support ferrule 16 (not shown), optical fiber 20, proximal jacket member 22, intermediate jacket member 24, junction tube 18 and junction tube 28.

The term "proximal", as used in this application, refers to the direction toward or point closest to the source of laser radiation. The term "distal", as used in this application, refers to the direction away from or point remote from the source of laser radiation.

Figure 2A:
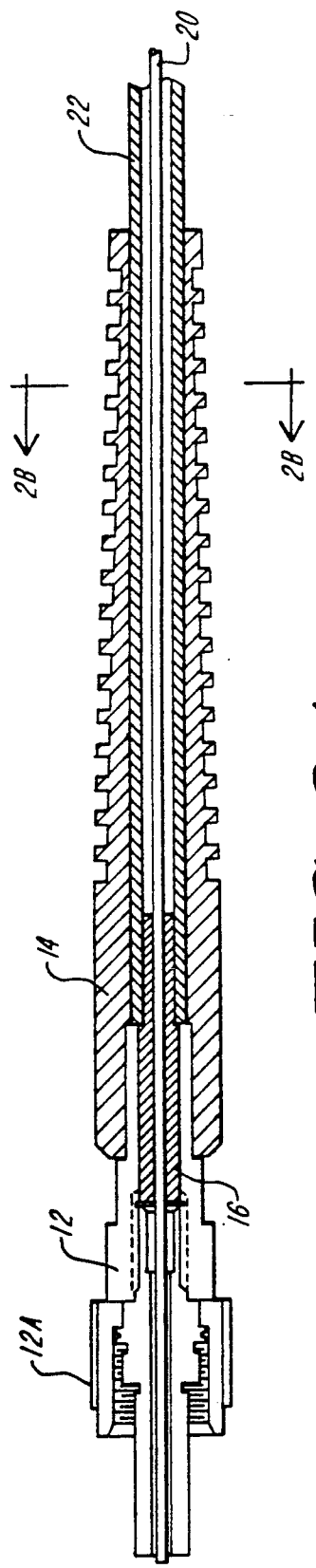
FIG. 2A is an enlarged cut-away view of the strain relief mechanism of the cable assembly of FIG. 1.

FIG. 2A illustrates a side, cut-away view of the proximal end of laser delivery system 10. Optical fiber 20 is a conventional silica fiber which may have a core diameter of 600 mm, a minimum bend radius of approximately 120 mm, a bandwidth of approximately 9 MHz km, and an operating temperature range of approximately −65° C. to 125° C. In the illustrative embodiment, fiber 20 has a length of approximately 13 feet. A fiber suitable for use as fiber 10 in the present invention is the High OH Fiber commercially available from 3M Specialty Optic Fibers, West Haven, Conn. The proximal end of fiber 20 extends into connector 12 and is mechanically secured therein.

Connector 12, in the illustrative embodiment, is a Standard Military Adaptor (SMA) used to optically couple fiber 20 with a source of laser radiation. Connector 12 has a rotatably mounted proximal section 12A having a threaded interior surface for coupling connector 12 to the complimentary connector on a laser source. Connector 12 may be formed of stainless steel or other suitably rigid material. Connector 12 contains a central bore which has a small diameter in its proximal region which increases to a larger diameter in its distal region. Fiber 20 is inserted through the central bore of connector 12 until the proximal end the fiber is flush with the proximal end of the connector. An optically clear epoxy is used to secure the fiber 20 within the central bore of connector 12. As illustrated, the diameter of the central bore at the distal end of connector 12 is substantially greater than the diameter of fiber 20.

Figure 3:
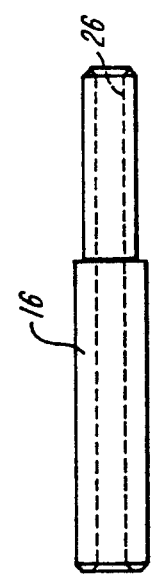
FIG. 3 is an enlarged side view of the support ferrule of the strain relief mechanism of FIG. 2.

A support ferrule 16 is inserted into the distal end of connector 12 to support optical fiber 20 as it projects from connector 12. As shown in FIG. 3, support ferrule 16 has a generally cylindrical shape having a stepped outer diameter and a constant diameter central bore 26, as shown in phantom, extending therethrough. Support ferrule 16 is preferably formed from a rigid material, such as brass, or other metal to provide fiber 20 with support as it projects from its anchoring point within connector 12. Support ferrule 16 is mechanically secured within the connector 12 and over fiber 20 with an optically clear epoxy. It will be obvious to those reasonably skilled in the art that support ferrule 16 may have a uniform outer diameter or a diameter which tapers from its proximal to its distal end without substantially impairing its function of supporting and axially aligning the optical fiber at its point of coupling with connector 12. The distal ends of support ferrule 16 and optical fiber 20 project distally beyond connector 12 into proximal jacket member 22, as illustrated in FIG. 2A.

Jacket member 22 comprises a flexible tube formed of teflon, polyethylene or similar material and serves to protect optical fiber 20. Jacket 22 may have a length of approximately 12 inches, an outer diameter of approximately 0.125 inches, an inner diameter of approximately 0.075 inches, and is adapted to slidably receive the distal end of support ferrule 16.

Figure 2B:
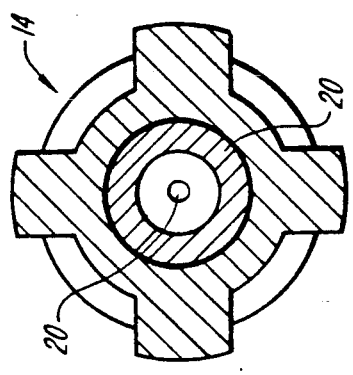
FIG. 2B is an enlarged, cross-sectional view of the strain relief mechanism of FIG. 2A as seen along lines 2B—2B.

A flexible strain relief boot 14 partially surrounds connector 12, ferrule 16, jacket member 22 and optical fiber 20, just distal of connector 12, as illustrated in FIG. 2A. Strain relief boot 14 has a generally cylindrical shape which tapers gradually from its proximal end to its distal end. Boot 14 has a smooth outer surface in its proximal region. The outer surface of the intermediate and distal regions of boot 14 is characterized by a plurality of parallel, annular ribs of progressively decreasing diameter which intersect a plurality of axially extending ribs, as illustrated in FIG. 2A-B. Such a design allows the intermediate and distal segments of the strain relief boot to be increasingly flexible in a distal direction while the proximal region remains relatively stiff. Strain relief member 14 preferably has a length of at least 2 inches, a length to width ratio of 7:1 at its widest diameter, and is formed of a semi rigid material, such as vinyl, having a tensile strength of approximately 2050 psi. The central bore extending through strain relief boot 14 and has an enlarged diameter at its proximal end to receive the distal end of connector 12, while jacket member 22 is received within the remaining uniform diameter portion of the bore.

As can be seen from FIG. 2A, the portion of optical fiber 20 projecting immediately beyond the distal end of connector 12 is surrounded by support ferrule 16, jacket member 22 and strain relief boot 14. As such, the fiber is maintained relatively rigid and becomes increasingly flexible in the distal direction. The substantial length of strain relief boot 14 and the presence of support ferrule 16 serve to maintain fiber 20 in axial alignment with the laser source and to limit the bend radius at the fiber proximal end. Consequently, optical fiber 20 transmits the laser radiation more efficiently since its tendency to be deflected beyond an optically acceptable limit are reduced at its proximal end.

Referring again to FIG. 1, intermediate jacket member 24 is disposed adjacent proximal jacket member 22. Jacket member 24 is formed of a material similar to that of jacket member 22 but has a smaller diameter. The proximal end of jacket member 24 is inserted a short distance into the distal end of jacket member 22 to provide an overlapping region. The junction of jackets 22 and 24 is covered by a junction tube 18 which is shown cut-away in FIG. 1. Tube 18 may have a length of approximately 3 inches and is preferably comprised of polyvinyl chloride (PVC) which is heat shrunk around the junction of jackets 22 and 24. Fiber 20 extends through jacket 24 and distally therebeyond. The point at which fiber 20 extends beyond jacket 24 is covered by a junction tube 28 which is similar in shape and composition to tube 18, and is also shown cut-away in FIG. 1. Tube 28 is heat shrunk about jacket 24 and fiber 20. Fiber 20 extends approximately 12 feet distally beyond jacket 24.

The laser delivery system 10 described above is suitable for use in urological procedures and may be used with an endoscope. In such applications the distal end of fiber 20 is inserted into the endoscope and advanced to a target sight within the body.

Referring to FIG. 4, a laser delivery system 30, according to a second embodiment of the present invention, is illustrated. System 30 comprises a connector 32, strain relief boot 34, support ferrule 36 (not shown), optical fiber 40 (shown in phantom), T-connector 38, proximal jacket member 42, intermediate jacket member 44, distal jacket member 50, coolant supply tube 46, luer 48, junction tubes 52, tip member 54, and junction tube 56. In the second embodiment, connector 32, strain relief boot 34, support ferrule 36, optical fiber 40, and proximal jacket member 42 are identical in size, structure and configuration to connector 12, strain relief member 14, support ferrule 16, optical fiber 20, and proximal jacket member 22, respectively, of catheter system 10, as described in the first embodiment of the present invention.

Referring to FIG. 5, a partial, exploded view of the elements of system 30 is illustrated. Optical fiber 40, shown in phantom, extends through connector 32, support ferrule 36, strain relief boot 34, proximal jacket member 42, T-connector 38, and an intermediate jacket member 44. Intermediate jacket member 44 is similar in composition to proximal jacket member 42 and may have a length of approximately 6 inches. In the second embodiment, proximal jacket member 42 and intermediate jacket member 44 may be formed of plastics such as Teflon ®, a polytetrafluoroethylene trademarked product of Du Pont Corp. of Wilmington, Del., or polyethylene, depending upon whether optical fiber 40 is to be cooled by a gas or a liquid, respectively, as explained hereinafter. The distal end of proximal jacket member 42 and the proximal end of intermediate jacket 44 are rotatably coupled to T connector 38.

As shown in FIG. 6, T-connector 38 comprises three tubular sections 38A-C which are formed integrally into a single body. The bores extending through sections 38A and 38B are axially aligned to form a central bore 39. A lateral bore 37 of segment 38C intersects central bore 39 at a right angle. It will be obvious to those reasonably skilled in the art that section 38C may be joined to sections 38A and 38B at other than a right angle, provided that bore 37 is in fluid communication with central bore 39. The diameter of bore 39 should be greater than the outer diameter of optical fiber 40 to allow cooling fluid to enter bore 39 through bore 37. In a preferred embodiment, bore 39 may have a uniform diameter of approximately 0.045 inches.

As illustrated in FIG. 6, the outer surface of segments 38A-C have a non uniform outer diameter to facilitate rotatable coupling of jacket members 42 and 44 to T connector 38. At their extremities, sections 38A-C may have an outer diameter of 0.065 inches which tapers to approximately 0.105 inches and then decreases abruptly to approximately 0.08 inches. As illustrated, the resulting tapered annular ridge on the outer surface of each section provides a structure which facilitates slidably receiving the tubular members in one direction while preventing disengagement therefrom in an opposite direction. The annular ridge on the outer surfaces of sections 38A-B further serves to limit the frictional interaction between each section its respective adjoining jacket to the extent necessary to maintain the connections while still allowing T-connector 38 to be rotated freely. It will be obvious to those reasonably skilled in the arts that the outer surfaces of sections 38A-C may have configurations other than those illustrated while still enabling T-connector 38 to be rotatably mounted to jacket member 42 and 44.

Referring again to FIGS. 4 and 5, the distal end of proximal jacket member 42 is slidably mounted over a section 38A of T-connector 38. The proximal end of intermediate jacket member 44 is slidably mounted over section 38B of T-connector 38. Optical fiber 40 extends through central bore 39 of T-connector 38. The top end of the coolant supply tube 46 is slidably mounted over section 38C of T connector 38 and secured thereto by epoxy or a similar adhesive agent. In this configuration, supply tube 46 and connector 38 may rotate 360° about the axis of optical fiber 40, allowing the source or port of cooling fluid to be disposed at various arcuate positions about the axis of the fiber while maintaining flow of the coolant into system 30. In the illustrative embodiment, T-connector 38 is formed from a rigid material, such as nylon.

A plurality of junction tubes 52 may be secured about the junctions of members 42, 44 and tube 46 about connector 38. Tubes 52 may be formed of polyolifin and have an adhesive lining on their interior surface. Tubes 52 are heat shrunk about the adjoining ends of members 42, 44 and tube 46. In an alternate embodiment, shrink tubes 56 may be eliminated completely. T connector 38 forms a joint with jacket members 42 and 44 which is freely rotatable through 360° and which remains fluid-tight, with or without tubes 52.

As shown in FIG. 4, coolant supply tube 46 is coupled at its top end to connector 38. Tube 46 is formed from polyethylene, has a length of approximately 12 inches and an internal diameter similar to jacket members 42 and 44. The bottom end of coolant supply tube 46 is coupled to a conventional luer 48 which is in turn coupled to a supply of cooling fluid. In the contemplated embodiments, the cooling fluid may be a liquid, such as water, or a gas, such as $CO_2$ or air from the ambient environment.

A distal jacket member 50 surrounds a majority of optical fiber 40. The proximal end of jacket member 50 is inserted into the distal end of intermediate jacket member 44 so that jacket member 44 overlaps jacket member 50 by several inches. Distal jacket member 50 has an internal diameter which is slightly greater than optical fiber 40 and a length of approximately 12 feet. A junction tube 56, similar in composition to junction tubes 52 and having a length of approximately 6 inches, is heat shrunk about the overlapping region of intermediate jacket member 44 and distal jacket member 50.

Tip member 54, disposed in the distal end of jacket member 50. Tip member 54 has a small diameter proximal end which surrounds optical fiber 40 and tapers to a wider diameter distal end which is frictionally maintained within the of distal end of jacket member 50. Tip member 54 contains one or more apertures which provide fluid communication between the interior of jacket member 50 and the ambient environment. Tip member 54 is preferably formed of stainless steel and serves to protect the distal tip of optical fiber 40, and vent air from the interior of system 30. Tip member 54 further facilitates cleaning and cooling of the distal tip of optical fiber 40.

Laser delivery system 30, as described above, is suitable for use in medical procedures performed on the gallbladder and gastrointestinal (GI) procedures, both upper GI and lower GI. System 30 provides an apparatus for delivering laser radiation to a remote sight within the body, which both improves transmissive qualities of the optical fiber, and provides a freely rotatable coupling member for variably positioning a source of cooling fluid in any arcuate position about the axis of the optical fiber.

Figure 7B:
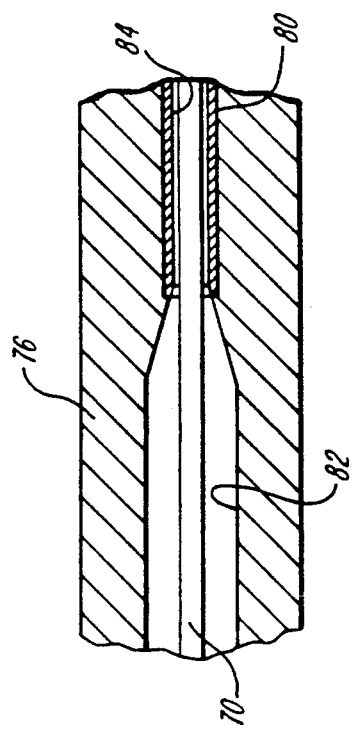
FIG. 7B is an enlarged side view of the handle assembly of the laser delivery system of FIG. 7A.
Figure 7A:
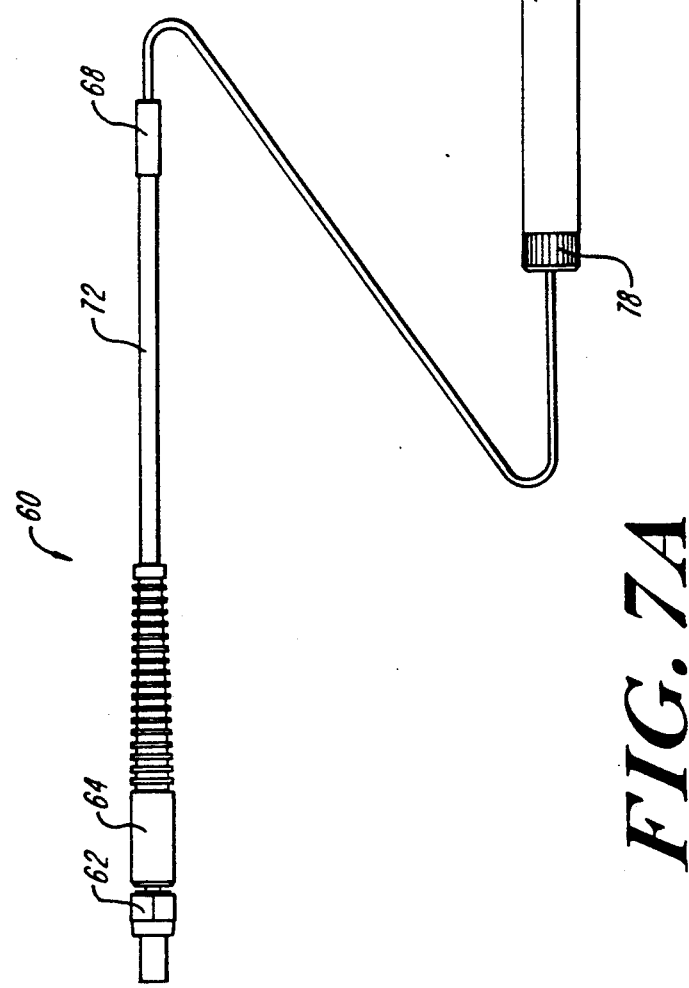
FIG. 7A is a side, partial cut-away view of a hand-held fiber optic cable assembly in accordance with a third embodiment of the present invention.

Referring to FIG. 7A, a hand-held laser delivery system 60, in accordance with a third embodiment of the present invention, is illustrated. Laser system 60 comprises a connector 62, strain relief boot 64, support ferrule 66 (not shown), junction tube 68, optical fiber 70, proximal jacket member 72, handle 76, bolt 78, and stem 80. In system 60, connector 62, strain relief boot 64, support ferrule 66, junction tube 68, optical fiber 70 and proximal jacket member 72 are similar in structure and arrangement to connector 12, strain relief boot 14, support ferrule 16, junction tube 18, optical fiber 20 and proximal jacket member 22, respectively, of laser system 10 of the first embodiment of the present invention.

Optical fiber 70 extends through proximal jacket member 72, handle 76, bolt 78 and stem 80. The sculptured distal tip of optical fiber 70 projects slightly beyond the distal end of stem 80. Optical fiber 70 extends approximately 12 feet distally beyond proximal jacket member 72 before entering into handle 76 and bolt 78. Junction tube 68 has a length of approximately one inch and is heat shrunk over the point at which optical fiber 70 emerges from proximal jacket member 72.

As shown in FIG. 7A, handle 76 has a generally cylindrical, elongate shape with a tapered distal end. A central bore 82 extends partially through handle 76 and is axially aligned with stem 80. The diameter of bore 82 of handle 76 may be 0.156 inches at its widest part. The distal end of bore 82 is tapered at is distal end to provide a smooth transition to the internal diameter of stem 80, as indicated in FIG. 7B. Handle 76 has a length of approximately 5 inches and is formed of a thermoplastic resin which is molded in place about the proximal end of stem 80. A material suitable for use as handle 76 is commercially available under the name Lexan ® from General Electric Company, Pittsfield, Mass. It will be obvious to those reasonably skilled in the art that the dimensions of handle 76 may be varied as desired. Similarly, it will be obvious to those reasonably skilled in the art that thermoplastics other than Lexan ®, having similar properties, may be suitable for use as handle 76. The proximal end of bore 82 may be threaded to received bolt 78.

Bolt 78 is preferably comprised of a rigid material, such as nylon, and has an aperture extending through the head thereof to receive optical fiber 70. Bolt 78 may have a conventional design which is screwed into the proximal end of handle 76 to secure fiber 70 within handle 76. Alternately, bolt 78 may be a hex head compression fitting which is frictionally secured to handle 76.

Stem 80 has a generally tubular shape with a slightly flared proximal end and a curved distal end. In the preferred embodiment, stem 80 is formed from substantially rigid material such as surgical stainless steel and may have a length of approximately 4 inches, and an inner diameter of approximately 0.063 inches and an outer diameter of approximately 0.083 inches. In the preferred embodiment, the proximal end of stem 80 may be flaired to have an outer diameter of approximately 0.09 inches. As shown in FIG. 7A, stem 80 extends into handle 76 approximately 2.0 inches. Handle 76 is molded about the proximal end of stem 80 in a conventional manner to insure that there is a smooth transition between bore 82 of handle 76 and bore 84 of stem 80.

The outer surface of the proximal portion of stem 80 has a coarse texture to facilitate adhering of the thermoplastic thereto and to prevent rotation of the stem within handle 76.

The smooth transition between bore 82 of handle 76 and bore 84 of stem 80 reduces the risk of chipping or damaging the sculptured tip of optical fiber 70 upon insertion into handle 76 and stem 80. In addition, the distance to which stem 80 extends into handle 76, and the molding of handle 76 about stem 80 result in a molded in place joint which is capable of withstanding considerable pressure. It will be obvious to those reasonably skilled in the art that the length of stem 80 may be varied as desired, as well as the radius of curvature of the stem distal end.

Laser delivery system 60, as described above, is suitable for use in contact surgical procedures and provides a hand-held laser delivery system which both improves the transmissive properties of the optical fiber at its point of coupling to the laser source, and provides a handle design which reduces the risk of chipping or damaging the sculptured tip of the fiber upon assembly.

Laser delivery systems 10, 30 and 60 are suitable for use with a Yitrium Aluminum Garnet (YAG) laser which produces laser radiation at mid-infrared wavelengths. Such a YAG laser may have between 25–100 watts of power. Laser delivery systems built in accordance with the illustrative embodiments of the present invention may transmit greater than 90% of the energy generated by the laser source. It will be obvious to those reasonably skilled in the art, however, that other types of lasers with other power ratings may be used with the laser delivery systems described herein.

Accordingly, it will be appreciated that the detailed disclosure has been presented by way of example only and is not intended to be limiting. Various alterations, modification and improvements will readily occur to those skilled in the art and may be practiced without departing from the spirit and scope of the invention. The invention is limited only as required by the following claims and equivalents thereto.

What is claimed is:

1. A fiber optic cable assembly for use in a laser delivery system comprising:
    an elongate optical fiber;
    a jacket member axially surrounding said optical fiber;
    means for optically coupling the optical fiber to a laser;
    a cylindrical strain relief boot attached to said coupling means and axially surrounding a substantial length of said jacket member and said fiber, said boot having a proximal end with a first outer diameter and a distal end with a second outer diameter which is less than the first outer diameter, the boot further having a length wherein the ratio of the boot length to the first outer diameter is at least 7:1;
    a support element axially surrounding a portion of said optical fiber and separating said optical fiber from said jacket member and said coupling means for maintaining the optical fiber in axial alignment with said laser.

2. The fiber optic cable assembly of claim 1 wherein said strain relief boot has a length of at least 2.0 inches.

3. The fiber optic cable assembly of claim 1 wherein said strain relief boot is formed from a material having a tensile strength of at least 2050 psi.

4. The fiber optic cable assembly of claim 1 wherein the strain relief boot has an outer surface at least partially characterized by a plurality of parallel, annular ribs of progressively decreasing diameter in a distal direction which intersect a plurality of axially extending ribs.

5. A fiber optic cable assembly for use in a laser delivery system comprising:
    an elongate optical fiber extending along an axis;
    first and second jacket portions disposed about first and second axial lengths, respectively, of said fiber; and
    a third jacket portion, rotatably coupled to said first and second jacket portions, said third jacket portion comprising three tubular passages, two of said passages arranged in axial alignment to surround said optical fiber about said axis, said third passage angularly connected to said two passages and rotatable in an arc about said fiber axis;
    said third passage operatively coupled to a fluid port, said port being disposed at various arcuate positions about said fiber axis for fluid flow into said third passage.

6. The fiber optic cable assembly of claim 5 further comprising:
    means for optically coupling the optical fiber to a source of laser radiation;
    a strain relief means attached to said coupling means and axially surrounding a substantial length of said first jacket portion and said fiber;
    a support element axially surrounding a portion of said optical fiber and separating said optical fiber from said first jacket portion and said coupling means.

7. The fiber optic cable assembly of claim 5 wherein the third tubular passage is rotatable in a 360° arc about the axis of the fiber.

8. The fiber optic cable assembly of claim 5 wherein the third passage is connected at a substantially right angle to said other two passages, said three tubular passages forming a generally T-shaped member.

9. A fiber optic cable assembly of claim 5 wherein the third jacket portion has an irregularly shaped exterior surface to facilitate fluid-tight, rotatable coupling with the first and second jacket portions.

10. In a laser delivery system comprising a laser, an elongate optical fiber optically coupled to said laser, a jacket member partially surrounding the axial length of said optical fiber, and a connector for coupling the optical fiber to said laser, the improvement comprising:
    an elongate plastic housing member defining an opened central bore extending therethrough for receiving said fiber, said housing member being substantially rigid and sized to be hand-held; and
    an elongate metal tube having a curved distal end and a flared proximal end integrally coupled to said housing member by a molded in place joint and axially aligned with said central bore so as to form a continuous bore into which said fiber is received, the metal tube extending distally beyond the housing member, said fiber extending distally beyond the distal end of said metal tube, said flared proximal end having a diameter which is greater than the diameter of the metal tube.

11. The laser delivery system of claim 10 further comprising:

a strain relief boot attached to said connected and axially surrounding a substantial length of said jacket member and said fiber; and a support element axially surrounding a portion of said optical fiber and separating said optical fiber from said jacket member and said connector.

12. A fiber optic cable assembly for use in a laser delivery system comprising:

an elongate optical fiber;

a jacket member axially surrounding the optical fiber;

means for optically coupling the optical fiber to a laser;

a support element having a generally cylindrical shape and axially surrounding a portion of the optical fiber, said support element having a first end partially received within the jacket member, and a second end received within said means for coupling; and a strain relief boot axially surrounding a substantial length of said jacket member, said fiber and said support element, said strain relief boot having a first end adapted to receive the means for coupling, the boot being formed from a material having a tensile strength of at least 2050 psi.

13. The fiber optic cable assembly of claim 12 wherein said strain relief boot has a length of at least 2.0 inches.

14. The fiber optic cable assembly of claim 12 wherein said boot has a proximal end having a first outer diameter and a distal end having a second outer diameter which is less than said first outer diameter.

15. The fiber optic cable assembly of claim 14 wherein the ratio of the boot length to the first diameter is 7:1.

16. A strain relief assembly for use with a fiber optic cable in a laser delivery system comprising:

an elongate optical fiber having proximal and distal ends;

a support element axially surrounding a portion of the proximal end of the optical fiber, the support element having a proximal and distal end;

a jacket member axially surrounding the optical fiber and having a proximal end adapted to receive the distal end of the support element;

means for optically coupling the optical fiber to a laser, said means for coupling having a distal end and adapted to receive the proximal end of the optical fiber and the proximal end of the support element; and a cylindrical strain relief boot axially surrounding a substantial length of said jacket member, said fiber and said support element, and having a proximal end adapted to receive the distal end of said means for coupling, the boot having a proximal end with a first outer diameter which tapers in a distal direction to a second outer diameter at the boot distal end, the second outer diameter being less than the first outer diameter, the boot having a length of at least 2.0 inches and wherein the ratio of the boot length to the first outer diameter is at least 7:1.

17. The strain relief assembly of claim 16 wherein the strain relief boot has an outer surface at least partially characterized by a plurality of parallel, annular ribs of progressively decreasing diameter in a distal direction which interest a plurality of axially extending ribs.

* * * * *